United States Patent [19]
Alexander et al.

[11] Patent Number: 5,363,920
[45] Date of Patent: Nov. 15, 1994

[54] ELASTOMERIC PASSIVE TENSIONER FOR OIL WELL RISERS

[75] Inventors: John V. Alexander, Santa Clara; Jerome T. Uchiyama, San Jose; Arthur F. Penner, Sunnyvale, all of Calif.

[73] Assignee: Westinghouse Electric Corporation, Pittsburgh, Pa.

[21] Appl. No.: 27,136

[22] Filed: Mar. 5, 1993

[51] Int. Cl.[5] .................................. E21B 17/01
[52] U.S. Cl. ..................... 166/350; 166/355; 166/359; 166/367; 405/224.4
[58] Field of Search ............ 166/350, 355, 359, 367; 405/224.2, 224.3, 168.2, 224.4; 175/7; 285/382.7; 114/267

[56] References Cited

U.S. PATENT DOCUMENTS

| | | | |
|---|---|---|---|
| 3,680,895 | 8/1972 | Herbert et al. | 285/167 |
| 3,734,546 | 5/1973 | Herbert et al. | 285/54 X |
| 4,068,868 | 1/1978 | Ohrt | 285/223 X |
| 4,121,861 | 10/1978 | Gorndt | 285/223 |
| 4,329,088 | 5/1982 | Lucas | 405/199 X |
| 4,332,509 | 6/1982 | Reynard et al. | 405/168.1 |
| 4,448,266 | 5/1984 | Potts | 166/367 X |
| 4,604,940 | 8/1986 | Mendelsohn et al. | 89/1.816 |
| 4,728,224 | 3/1988 | Salama et al. | 166/367 X |
| 5,101,905 | 4/1992 | Arlt et al. | 166/350 |

Primary Examiner—Roger J. Schoeppel

[57] ABSTRACT

A passive tensioner is described for accommodating the tensile loading between a floating oil production platform and a riser. The tensioner includes a stack of strut elements, each of which has a plurality of struts of an elastomeric material individually configured to respond to a compressive load by buckling in a predetermined direction, means for constraining the stack during such buckling in a direction generally orthogonal to the direction of the compressive load and means for translating the tensile loading because of ocean wave, current or other liquid action on the platform into a compressive load and applying the same to the stack.

31 Claims, 4 Drawing Sheets

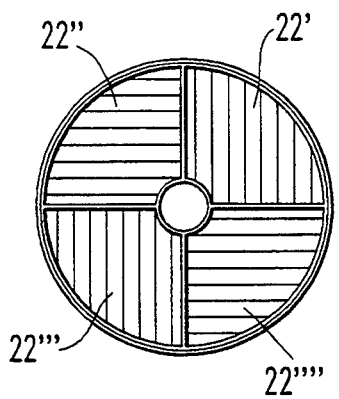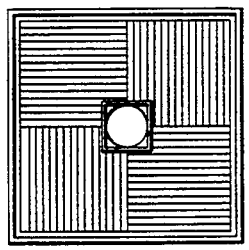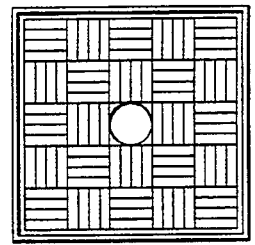
FIG. 7  FIG. 8A  FIG. 8B
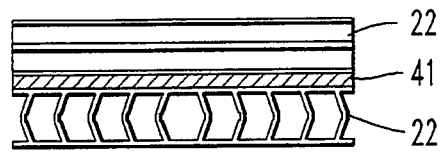
FIG. 10A
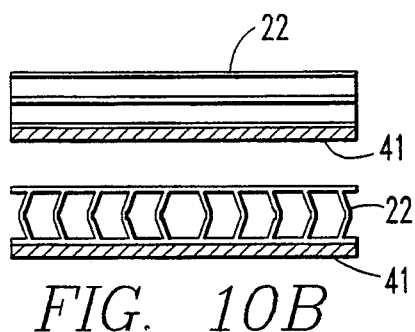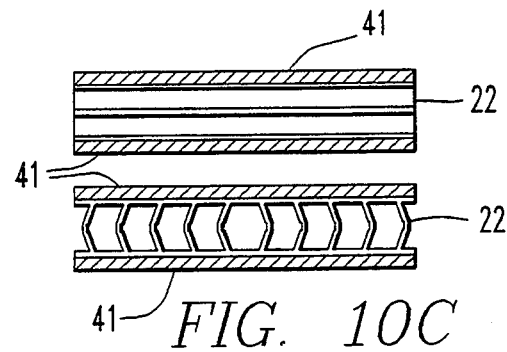
FIG. 10B  FIG. 10C
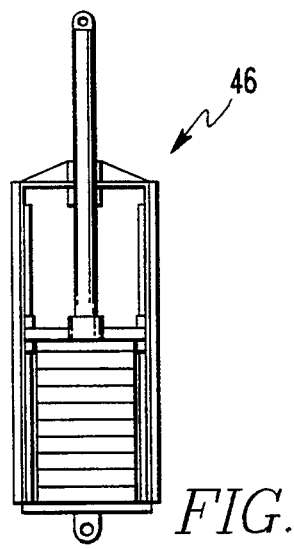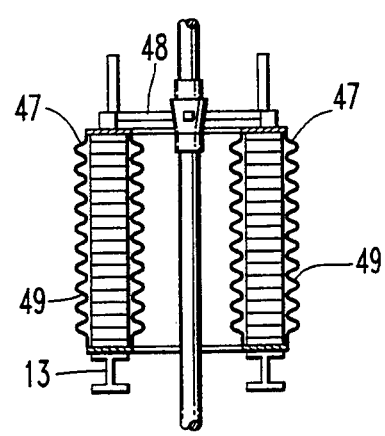
FIG. 11  FIG. 12

ELASTOMERIC PASSIVE TENSIONER FOR OIL WELL RISERS

BACKGROUND OF THE INVENTION

The present invention relates to accommodating loading and, more particularly, to apparatus for tailoring the response to such loading applied by reason of motion of one structure relative to another. In a preferred implementation, it relates to a passive tensioner for absorbing the loading caused by relative motion between a floating oil or other platform and a riser or the like which has either no, or a defined, motion relative to wave or other liquid action on the platform, and a method for absorbing such loading.

It will be recognized that floating or semisubmerged oil platforms are subjected to relatively constant movement due to wave motion, current drift or other liquid action. These platforms, though, have one or more riser strings which extend into the sea floor for any of various purposes relating to the exploration for, or the extraction of, a liquid fossil fuel such as crude oil. These riser strings do not, of course, move with the typical liquid action.

Tensioners have been developed in the past for generating tensile loads to accommodate the loading generated between a floating platform and riser strings because of the relative motion or forces between the same. In this connection, tension is applied to the top of the riser string between an adapter that attaches to the uppermost riser and the platform foundation. That is, a tailored tension is maintained on the riser strings to prevent failure due to buckling or bending.

The majority of tensioners developed and used in the past have been active devices. Either a pressurized gas or fluid is used in the cylinder to maintain the desired tension force while compensating for any motion of the platform. It has been believed that an active tensioner is necessary to provide the tailored response to the motion which is desired. However, passive tensioners also have been designed in the past. An example is that described in U.S. Pat. No. 5,101,905 issued Apr. 7, 1992 to Arlt et al. In general, though, such tensioners have not been designed to allow one to tailor the response to the loading, based on the displacement it might represent. In this connection, while it is noted in the Arlt et al patent that one can vary a spring force and achieve differing dynamic characteristics by using differing configurations of elastomeric spring elements (see Arlt et al col. 3, lines 58-61), Arlt et al certainly does not describe how such might be done and what criteria is important to do so.

SUMMARY OF THE INVENTION

The present invention provides a basic design for an elastomeric passive tensioner design which enables one to tailor the response of the tensioner when it is subjected to an expected compressive load. It converts the tension which is generated into a compressive load. The tensioner includes a stack of strut elements, each of which has at least two struts which are not only made of an elastomeric material, but are individually configured to respond to a compressive load by buckling in a predetermined direction. Most desirably, the struts are oriented relative to one another to buckle in opposed directions.

In order to assure that the tailoring of the stacks will provide the desired response to compressive loading, means are included for constraining the stack in the direction(s) which is generally orthogonal to the direction of the compressive loading. The result of such constraint is that the strut elements in the stack absorb the compressive load without possible unknown movement transverse to the load interfering with any tailoring. The tensioner further includes means for translating the liquid action into the compressive load and applying the same to the stack in the loading direction.

The invention further relates to a method for absorbing compressive loading which includes the step of constraining the strut elements to only a predefined movement. It also includes the broad concept of stacking and constraining movement of a plurality of strut elements as described in order to provide a structure which can absorb loading.

BRIEF DESCRIPTION OF THE DRAWINGS

With reference to the accompanying three sheets of drawing:

FIG. 7 is a schematic cross-sectional view showing the arrangement of strut elements in a single layer of a stack of strut elements within the preferred embodiment of a passive tensioner of the invention;

FIGS. 8A and 8B show alternate arrangements of strut elements for of a layer within a rectangular passive tensioner incorporating the invention;

FIGS. 10A-10C illustrate alternate configurations of the relationship of a substrate plate to strut elements;

FIG. 11 is a schematic illustration of an alternate passive tensioner incorporating the invention; and FIG. 12 is a schematic illustration of another alternate construction of a passive tensioner incorporating the invention.

DETAILED DESCRIPTION OF THE PREFERRED EMBODIMENTS

The following relatively detailed description is provided to satisfy the patent statutes. However, it will be appreciated by those skilled in the art that various changes and modifications can be made without departing from the invention.

Figure 1:
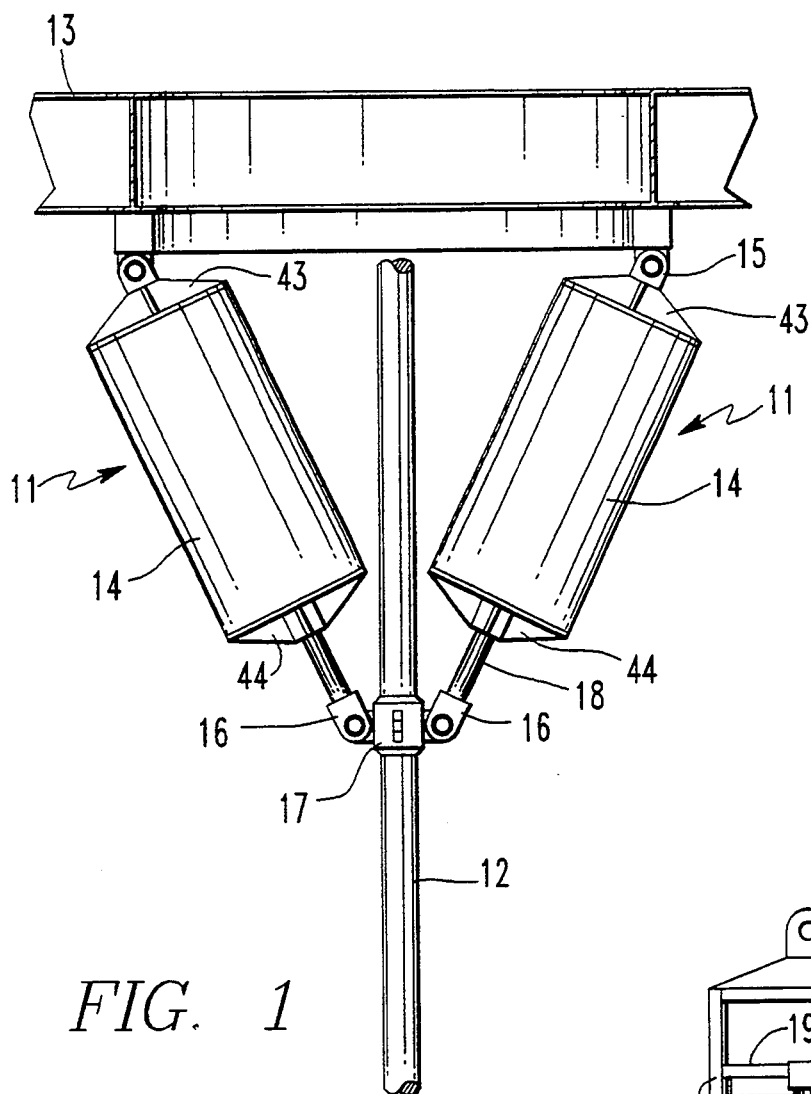
FIG. 1 is a somewhat schematic elevation view illustrating two preferred embodiment passive tensioners of the invention connected between a floating oil platform and a riser.
Figure 2:
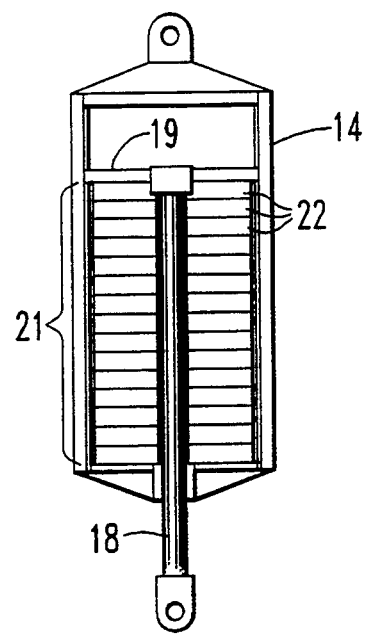
FIG. 2 is an enlarged sectional view of the preferred embodiment.

With reference to FIGS. 1 and 2, a plurality of riser tensioners of the invention, generally referred to by the reference numeral 11, are illustrated operatively connected between a riser 12 and the substructure of a floating oil platform 13. Although not illustrated, the riser 12 is the uppermost riser of a riser string which extends to or into the bottom of the sea floor. It also extends through the floor of the platform 13. Although not illustrated for simplicity, it will be recognized that in most instances there are three or more tensioners for each riser, equally spaced about their associated riser.

The connection of each passive tensioner 11 is schematically illustrated in FIG. 1. That is, the upper end of a casing 14 of each tensioner includes a connection flange 15 for securance to the platform, whereas the opposite end includes a connection flange 16 for securance to an appropriate connecting structure 17 on the riser 12. The flange 16 is on one end of a shaft 18 which extends upwardly through the tensioner and terminates in a follower plate 19. This construction results in any relative motion between the riser 12 and the platform 13 becoming corresponding motion of the casing 12 relative to the shaft 18 and, hence, relative to the follower plate 19. This motion provides tensile loading between the riser and the platform. The tensioner of the invention converts this tensile loading to a compressive load and accommodates the same. That is, if there is an appropriate compressive preloading when the connection is made, such movement will either relieve or increase the compressive loading provided by the plate 19 on a stack 21 of strut elements 22 arranged in layers.

Figure 3:
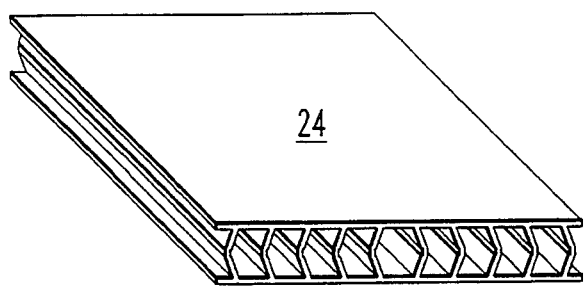
FIG. 3 is an enlarged isometric view of a single strut element for the preferred embodiment.
Figure 4:
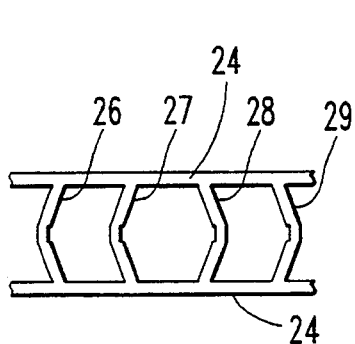
FIG. 4 is an enlarged partial sectional view of a portion of the strut element of FIG. 3, illustrating the configuration of the struts of the same.
Figure 5:
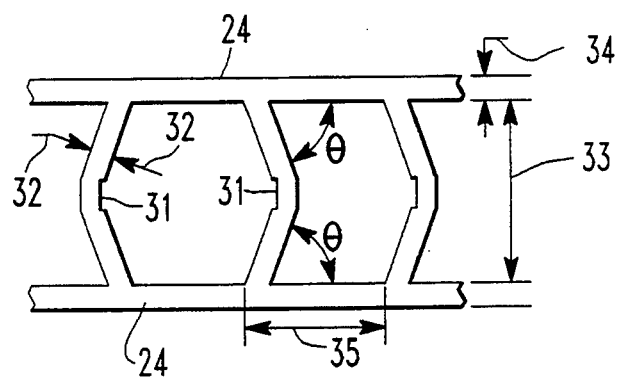
FIG. 5 is an enlarged fragmentary sectional view similar to that of FIG. 4, illustrating certain dimensional and angular characteristics of the strut element.

The construction of each strut element is best illustrated in FIGS. 3, 4 and 5. Each includes a pair of face sheets 24 which are generally parallel and opposed to one another. Struts 26–29 extend between such face sheets. The strut configuration is a "pre-buckled" one which makes it easy to control their buckling response to a compressive load. Most desirably, each full strut element is molded as a one piece unit from a material which is compliant and will respond to compression in a known manner. Such material most desirably is a resilient elastomeric material such as a polyurethane, fluorocarbon, silicone, ethylene propylene diene monomer (EPDM), natural rubber, chlorinated polyethylene, or polyisoprene. It has been found that a specific formulation in which polyurethane is the dominant material is best, which formulation is disclosed in detail in U.S. Pat. No. 4,604,940 issued Aug. 12, 1986 to Mendelsohn et al, the disclosure of which is incorporated herein by reference. Each strut element is physically pre-conditioned after manufacture, to optimize the mechanical performance.

An important aspect of the invention is that each of the struts is configured to respond to a compressive load by buckling in a predetermined direction. To this end, each strut 26 is angularly related to the opposed face sheets 24 between which it extends, the direction of the angular relationship at the opposite ends of the strut being the same. Most simply from the constructional and analysis standpoint, the angles at the opposite ends of each of the struts (and for all of the struts) are the same value. This angular value is represented in FIG. 5 by 8. As illustrated, each strut is, in essence, a chevron in section. Each of the struts also may include a notch 31 or a similar geometrical discontinuity to aid in initiating and controlling compression of the strut in the appropriate direction. The configuration of the discontinuity can be tailored for this purpose. It should be noted that the basic configuration of the individual strut elements has been used in the past to isolate missiles from shock imparted to their launchers.

The thickness of each of the struts, represented in FIG. 5 by the arrows 32, is an important variable that can be selected to provide a desired tailored response to a compressive load. The length or height of the struts, represented at 33 in FIG. 5, is another variable which can be appropriately selected to aid in providing a desired compressive load. The thickness of the face sheets represented at 34 is also a variable which has to be selected or taken into consideration when one tailors a strut element to provide a desired response to a compressive load. The distance between the struts represented at 35 is also a variable that affects the desired response of the strut element to a compressive load.

Figure 6:
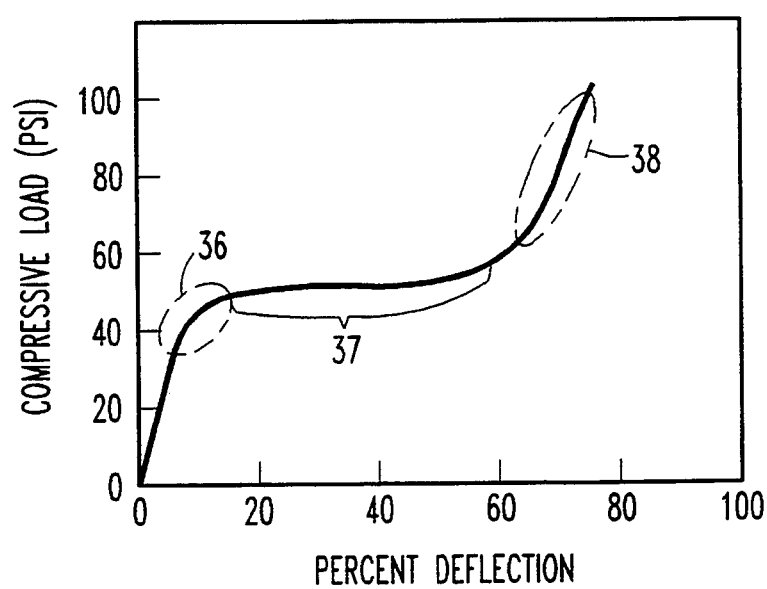
FIG. 6 is a graph of an exemplary force-deflection curve obtainable with tailoring from the instant invention.

FIG. 6 illustrates a typical compression-deflection curve for a single strut element. Initial compression (first 10–15%) of the element results in a nearly linear increase in loading, similar to that of a helical spring. This is driven by the load required to initiate buckling of the struts and is a function primarily of strut angle and elastomer thickness. Although selections for the dimension and other matters discussed above aid in determining the abruptness of the "knee" of the curve (represented by that portion of the curve encircled at 36), the notch or similar discontinuity presence, and its configuration and dimensions, are important aspects in determining its degree of curvature.

In most situations a passive tensioner of the invention is preloaded to prevent the initial compression from being a factor in the response of the tensioner to the relative motion caused by the liquid action. In keeping with the invention, the loading remains nearly constant for about 10% through 60% of element compression. This is the area of the curve represented by 37 and is referred to in the art as "pressure plateau" for an element. This pressure plateau can be increased by altering the strut thickness and angle. It occurs as each of the struts continue to buckle. When the struts in the elements fully collapse, the slope of the force-deflection curve will increase significantly. This portion of the curve is encircled at 38. When the struts are fully buckled, it will be appreciated that the strutted element then acts as a solid elastomeric which is subjected to compression. The shape of this entire compression deflection curve can be modified by varying the strut configuration discussed above in connection with FIGS. 4 and 5.

The following examples are given to illustrate how selection of the various variables can result in a desired response.

| Dimension | Example 1 | Example 2 |
| --- | --- | --- |
| Strut Height: | 1.55" | 2.16" |
| Strut Angle: | 71°30' | 70° |
| Strut Thickness: | .15" | .32" |
| Face Sheet Thickness: | .09" | .17" |
| Notch Depth: | .03" | .07" |
| Notch Height: | .1" | .44" |
| Strut Spacing: | .83" | 1.37" |

The geometry of example 1 produces a force-deflection curve with nearly flat pressure plateau from about 5% to 55% compression of element free height. The geometry of example 2 produces a nearly linear increasing force-deflection profile from 0 to 50% compression of element free height, and no actual pressure plateau. These two examples represent extremes; numerous other arrangements can be produced with other force-deflection characteristics, as dictated by particular applications.

The struts of each element are arranged to provide compression in materially different directions. That is, as can be seen in FIG. 4, struts 26 and 27 face in a direction which is opposite that in which struts 28 and 29 face. The result of this construction is that these two groups of struts will collapse in opposed directions. Each element thus can be designed so that there are no resultant lateral forces on the opposed face sheets.

As another aspect of the invention, the strut elements are stacked as is illustrated in FIG. 2. The stacking provides many advantageous functions to the tensioner. For example, it enables one to control stroke capability and the amount of deflection. The stacking also aids considerably in the ability to tailor each tensioner to the particular load characteristics expected with a selected platform/riser relationship.

Each layer in the stack is made up of a multiple number of strut elements. FIG. 7 illustrates such a layer. It will be seen that there are four strut elements 22' through 22''''. Each of such strut elements is the same as all of the other ones so that each acts, in essence, as a module which can be used to replace other strut elements in such layer. Moreover, the strut elements of each layer together provide struts for the layer which face in the four orthogonally related directions in the plane of such layer. (In this connection, the direction of the lines in each of the strut elements represents the direction of the struts of such element.) It will be recognized that this desirable strut relationship is simply achieved merely by orienting each strut element 90° orthogonal to its adjacent strut element. It will assure that each layer in the stack will provide a uniform response to a compressive load without unbalanced lateral forces being created. FIGS. 8A and 8B illustrate other strut element relative orientations which can be used to achieve this desirable characteristic in a stack when the tensioner is rectangular in section.

Figure 9:
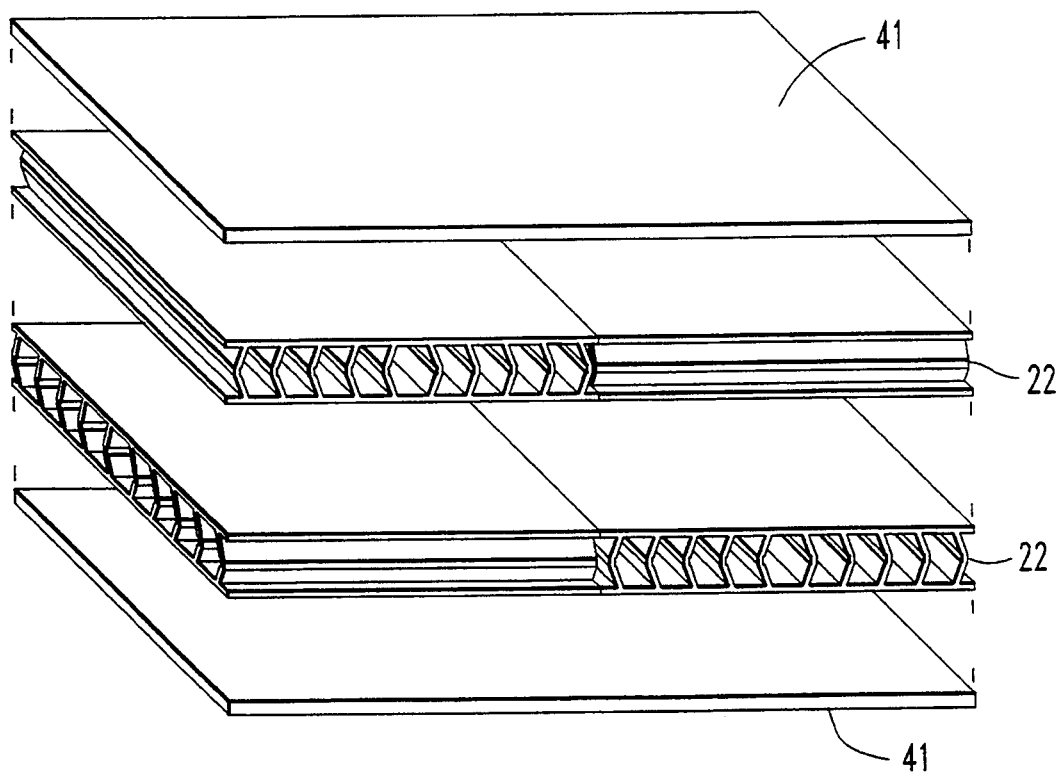
FIG. 9 is an exploded, isometric view illustrating a pair of substrate plates sandwiching between them a pair of layers of strut elements of a stack.

Each stack of strut elements also includes flat substrate plates of a metal, composite or the like which, among other things, add rigidity to the individual strut elements when the stack is subjected to a compressive load. Two of such substrate plates of a glass/epoxy composite are indicated in FIG. 9 by the reference numeral 41. As illustrated, such plates have sandwiched between them, a pair of strut elements 22. This sandwiching results in a plate mating with one of the face sheets of both of the strut elements. The face sheets of the two layers of strut elements directly adjacent each other without a substrate between them, may be bonded or otherwise secured together to prevent independent movement between the same. While the nature of the bonding material will depend upon the materials to be bonded and the compressive load to which it is expected to be subjected, it has been found that epoxy forms a good bond between the polyurethane material described above and a rigid plate made of a glass/epoxy composite.

It is important to note that the strut elements of the immediately adjacent aspects of the two layers illustrated face in directions which are orthogonal to one another. In other words, the strut elements of each layer as illustrated are orthogonal to the corresponding strut elements of the adjacent layer. Although not illustrated, this configuration is repeated for the full stack.

It also should be noted that each of the individual layers is the same as the other layers and also is a module. By making the strut elements in a number of separable layers, assembly and maintenance of the tensioner is simplified.

FIGS. 10A–10C show other configurations of a substrate plate relative to strut elements. In FIG. 10A, the plate 41 is between two strut elements 22, whereas in FIG. 10B each of the strut elements 22 includes a substrate plate 41 bonded to one of its surfaces with the resulting constructions for separate layers being in contact with the free facing sheets of the adjacent layer. If desired, the substrate plate also could be bonded to such free facing sheet. In FIG. 10C both facing sheets of each strut element 22 has a rigid substrate plate 41 bonded thereto.

As another important aspect of the invention, means are included for constraining the stack during its buckling in a direction which is generally orthogonal to the direction of the compressive loading. This constraint prevents uncontrolled lateral motion between the elements which might interfere with the desired response of the stack to compressive loading. In the preferred arrangement illustrated in FIG. 2, such means is simply the casing 14. It circumscribes the stack 21 in the direction of the expected compressive load and prevents the strut elements of the stack from moving laterally relative to one another. It is to be appreciated that there is some space between the edge of the stack defined by the individual strut elements and the location of the casing. (This is particularly noticeable in FIG. 7.) Thus some "squeezing" action is permitted. Top and lower caps 43 and 44 are also provided to completely enclose the stacks.

Although the passive tensioners of the invention are illustrated in FIG. 1 angularly related to the riser and platform, it will be recognized by those skilled in the field that the inventive aspects of the arrangement also can be utilized in arrangements in which the passive tensioners are positioned generally parallel to the riser. Moreover, the tensioner itself as illustrated is of the pull type. That is, with reference to FIGS. 1 and 2 it will be seen that compressive loading will turn into shaft motion which will tend to pull the follower plate 19 to obtain the desired compression. Other arrangements are also possible. For example, FIG. 11 illustrates an arrangement 46 in which the shaft and follower plate apply a compressive load to the stack by a pushing action. Instead of the shaft being connected in the riser end of the tensioner, it is connected to the platform, i.e., that end of the tensioner which does not have the stack. In the push type tensioner, the shaft is still attached to the riser and the casing is attached to the platform, but the arrangement is a mirror image of FIG. 1. This allows the tensioner to still provide a tension load on the riser, while in turn converting that load to compression on the strut elements. One advantage of such an arrangement is, of course, that in tailoring the response of the stack to loading, one need not take into consideration the fact that the shaft passes through the stack. FIG. 12 shows an arrangement for utilizing tensioners of the invention above the platform. With reference to such figure, it shows a plurality of tensioners 47 connected between a platform represented at 13 by bracing, and a spoke type connector 48 having a collar rigidly circumscribing that portion of a riser 12 above the platform. Each of the tensioners 47 is illustrated with a bellows 49 to accommodate the expected change in length direction of the tensioner itself because of buckling. Means, such as a telescopic tube or other arrangement which easily can be selected and provided by those skilled in the field, are provided in this embodiment to constrain the stack. While not illustrated, it will be appreciated that in most instances a relatively large number (eight) of tensioners as described will be provided surrounding the riser for which they are provided.

As mentioned previously, the specific embodiments are exemplary, rather than exhaustive. The claims, their equivalents and their equivalent language define the scope of protection.

What we claim is:

1. A passive tensioner for absorbing loading resulting because of relative motion between a floating platform and a riser or the like which has either no, or a defined, motion relative to wave or other liquid action on the platform, comprising:
   a) a stack of strut elements arranged in layers, each element of which includes at least two struts of elastomeric material which are individually configured to respond to a compressive load by buckling in a predetermined direction;
   b) means for constraining said stack during said buckling in a direction generally orthogonal to the direction of said compressive load; and
   c) means for translating said wave or other liquid action into a compressive load and applying the same to said stack.

2. The passive tensioner of claim 1 where the dominant material of said struts is selected from the group consisting of polyurethane, fluorocarbon, silicone, ethylene propylene diene monomer, natural rubber, chlorinated polyethylene, and polyisoprene.

3. The passive tensioner of claim 2 wherein said dominant material of said struts is polyurethane.

4. The passive tensioner of claim 1 wherein said at least two struts of each of said strut elements are oriented relative to one another to buckle in materially different directions.

5. The passive tensioner of claim 4 wherein each said layer of said stack is made up of a plurality of strut elements which together provide struts for a plane defined by said layer, facing in four orthogonally related directions.

6. The passive tensioner of claim 1 wherein all of said strut elements are identical whereby each may be substituted for any other.

7. The passive tensioner of claim 1 wherein each said layer of said stack is identical to all other layers of said stack, whereby each layer is a module for said tensioner which may be substituted for any other layer therein.

8. The passive tensioner of claim 1 wherein the configuration and material of each of said struts is tailored to provide a predetermined resistance to buckling over a significant extent of an expected deflection range.

9. The passive tensioner of claim 8 wherein each of said struts is tailored to provide a relatively constant resistance to said compressive load over a significant extent of its expected deflection range.

10. The passive tensioner of claim 8 wherein the configuration of each of said struts is a chevron in section.

11. The passive tensioner of claim 1 further including a geometrical discontinuity in each of said struts to aid in directing buckling in said predetermined direction.

12. The passive tensioner of claim 1 wherein said strut elements of said stack are oriented relative to one another to orient their respective struts to respond to said compressive load by buckling in opposed directions.

13. The passive tensioner of claim 10 wherein each said layer of strut elements in said stack is made up of a plurality of said strut elements, said elements in each said layer collectively providing struts configured to respond to a compressive load by buckling in four orthogonally related directions in a plane.

14. The passive tensioner of claim 1 wherein the strut elements of each said layer in said stack are oriented orthogonally to the corresponding strut elements of an adjacent one of said layers in said stack.

15. The passive tensioner of claim 1 wherein each of said strut elements includes a pair of opposed face sheets between which said struts extend.

16. The passive tensioner of claim 15 including a rigid substrate plate mating with at least one of said face sheets.

17. The passive tensioner of claim 1 wherein said means for constraining said stack during said buckling includes a casing circumscribing said stack in the direction of the expected compressive load.

18. The passive tensioner of claim 1 wherein said means for translating and applying includes a shaft to which relative movement caused by said wave or other liquid action on the platform is imparted, and a follower plate which is connected to said shaft to apply a compressive load to said stack directly related to the degree of movement of said shaft.

19. In a method of absorbing loading resulting because of relative motion between a floating platform and a riser or the like which has either no, or a defined, motion relative to wave or other liquid action on the platform, comprising the steps of:
   a) applying said loading as a compressive load to a stack of strut elements, each of which includes at least two struts of an elastomeric material which are individually configured to respond to a compressive load by buckling in a predetermined direction; and
   b) constraining said stack for a predefined movement during said buckling.

20. The method of claim 19 wherein said step of constraining said stack includes constraining the same against material movement in a direction generally orthogonal to the direction of said compressive load.

21. The method of claim 19 further including the step of providing a precompressive load on said stack to place said strut elements in a deflection range of the same for which they are tailored to provide a desired response to said compressive load.

22. The method of claim 19 wherein said at least two struts of each element are oriented relative to one another to buckle in materially different directions.

23. The method of claim 22 wherein said stack has a plurality of strut elements collectively providing struts facing in four different orthogonally related directions.

24. A passive tensioner for absorbing loading resulting because of relative motion between a floating platform and a riser or the like which has either no, or a defined, motion relative to wave or other liquid action on the platform, comprising:
   a) a layered stack of strut elements, each-one of which includes:
      i) a plurality of struts made of an elastomeric material, which struts are individually configured to respond to a compressive load by buckling in a predetermined direction with at least two struts of each element oriented relative to one another to buckle in opposed directions;
      ii) a pair of opposed, generally parallel face sheets between which said struts extend; and iii) the struts of immediately adjacent portions of adjacent layers being orthogonally opposed to one another;

b) at least one rigid substrate plate mating with one of said sheets of each of said strut elements;

c) a casing circumscribing said stack to constrain movement of said strut elements in a direction generally orthogonal to the direction of compressive loading; and d) a shaft to which relative movement caused by said wave or other liquid action on the platform is imparted, and a follower plate which is connected to said shaft to apply a compressive load to said stack directly related to the degree of movement of said shaft.

25. The passive tensioner of claim 24 wherein the configuration of each of said struts is a chevron in section.

26. Apparatus for absorbing loading comprising:

a) a stack of strut elements, each one of which includes at least two struts made of an elastomer material individually configured to respond to a compressive load by buckling in a predetermined direction;

b) means for constraining said stack during said buckling; and c) means for applying a compressive load corresponding to said loading, to said stack.

27. The apparatus of claim 26 wherein said two struts of each element are oriented relative to one another to buckle in materially different directions.

28. The apparatus of claim 27 wherein each layer of said stack is made up of a plurality of strut elements which together provide struts for a plane defined by said layer, facing in four orthogonally related directions.

29. The apparatus of claim 27 wherein said strut elements are the same as one another whereby each may be substituted for any other.

30. The passive tensioner of claim 26 wherein the configuration and material of each of said struts is tailored to provide a predetermined resistance to buckling over a significant extent of an expected deflection range.

31. The passive tensioner of claim 26 wherein each of said strut elements includes a pair of opposed face sheets between which said two struts extend.

* * * * *